(12) United States Patent
Wei et al.

(10) Patent No.: US 9,754,612 B2
(45) Date of Patent: Sep. 5, 2017

(54) AREAL DENSITY IMPROVEMENT OF PERPENDICULAR MAGNETIC RECORDING (PMR) WRITE HEAD BY TUNING MAGNETIC FLUX LOOPS

(71) Applicant: Headway Technologies, Inc., Milpitas, CA (US)

(72) Inventors: Yaguang Wei, Pleasanton, CA (US); Yuhui Tang, Milpitas, CA (US); Moris Dovek, San Jose, CA (US); Yue Liu, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 14/947,577

(22) Filed: Nov. 20, 2015

(65) Prior Publication Data

US 2017/0148473 A1    May 25, 2017

(51) Int. Cl.
*G11B 5/127*    (2006.01)
*G11B 5/31*    (2006.01)
*G11B 5/147*    (2006.01)

(52) U.S. Cl.
CPC ............ *G11B 5/315* (2013.01); *G11B 5/1278* (2013.01); *G11B 5/1475* (2013.01); *G11B 5/3116* (2013.01)

(58) Field of Classification Search
None
See application file for complete search history.

(56) References Cited

U.S. PATENT DOCUMENTS

| 8,218,264 | B1 | 7/2012 | Sasaki et al. |
| 8,274,758 | B2 | 9/2012 | Wu et al. |
| 8,810,764 | B2 | 8/2014 | Nishida et al. |
| 8,828,248 | B2 | 9/2014 | Mao et al. |
| 8,836,059 | B2 | 9/2014 | Ahn et al. |
| 9,299,367 | B1 * | 3/2016 | Tang ............... G11B 5/127 |
| 9,502,053 | B1 * | 11/2016 | Gurovich ........... G11B 5/3116 |
| 9,508,364 | B1 * | 11/2016 | Tang ............... G11B 5/112 |
| 2008/0112080 | A1 * | 5/2008 | Lengsfield ......... G11B 5/1278 360/125.04 |
| 2011/0063755 | A1 * | 3/2011 | Bai ............... G11B 5/1278 360/123.12 |
| 2016/0307586 | A1 * | 10/2016 | Liu ............... G11B 5/187 |

* cited by examiner

*Primary Examiner* — Will J Klimowicz
(74) *Attorney, Agent, or Firm* — Saile Ackerman LLC; Stephen B. Ackerman

(57) ABSTRACT

A PMR writer is disclosed wherein magnetic flux return from a magnetic medium to a main pole is substantially greater through a trailing shield structure than through a leading shield and return path layer (RTP). Magnetic impedance is increased between the RTP and main pole in the leading return loop by modifying the size and shape of the back gap connection (BGC), by decreasing Bs in the RTP or reducing its thickness, or by removing one or more layers in the BGC and replacing with dielectric material or non-magnetic metal to form a dielectric gap between the RTP and main pole. As a result, area density control and bit error rate are improved over a conventional dual write shield (DWS) structure comprising two flux return pathways. Moreover, adjacent track erasure is maintained at a level similar to a DWS design.

6 Claims, 11 Drawing Sheets

AREAL DENSITY IMPROVEMENT OF PERPENDICULAR MAGNETIC RECORDING (PMR) WRITE HEAD BY TUNING MAGNETIC FLUX LOOPS

RELATED PATENT APPLICATIONS

This application is related to the following: U.S. Pat. Nos. 8,218,264 and 8,274,758; both assigned to a common assignee and herein incorporated by reference in their entirety.

TECHNICAL FIELD

The present disclosure relates to controlling magnetic flux return in a PMR write head such that flux intensity through a PP3 trailing shield and trailing loop is enhanced to improve area density capability (ADC) while sufficient magnetic flux is maintained in a leading loop to keep adjacent track erasure (ATE) and bit error rate (BER) at acceptable levels.

BACKGROUND

Perpendicular recording has been developed in part to achieve higher recording density than is realized with longitudinal recording devices. A PMR write head typically has a main pole layer with a small surface area at an ABS, and coils that conduct a current and generate a magnetic flux in the main pole such that the magnetic flux exits through a write pole tip and enters a magnetic medium (disk) adjacent to the ABS. Magnetic flux is used to write a selected number of bits in the magnetic medium and typically returns to the main pole through two pathways including a trailing loop and a leading loop. The trailing loop has a trailing shield structure with first and second trailing shield sides at the ABS. The second (PP3) trailing shield arches over the write coils and connects to a top yoke that adjoins a top surface of the main pole layer near a back gap connection. The leading loop includes a leading shield with a side at the ABS and that is connected to a return path (RTP) proximate to the ABS. The RTP extends to the back gap connection (BGC) and enables magnetic flux in the leading loop pathway to return from the leading shield at the ABS and through the BGC to the main pole layer. A PMR head which combines the features of a single pole writer and a double layered medium (magnetic disk) has a great advantage over LMR in providing higher write field, better read back signal, and potentially much higher areal density.

The double write shield (DWS) design that features the leading and trailing loops was invented for ATE improvement by reducing stray field in side shields and in the leading shield. Magnetic flux is able to flow evenly through the leading loop and trailing loop. Compared with a non-DWS configuration where there is only a closed loop from the trailing side of the main pole, a DWS structure has better ATE. However, since flux in the trailing loop of a DWS configuration is only 50% of that in a non-DWS design, the result is a degraded hot seed (HS) response and therefore a loss in ADC. The hot seed is a magnetic layer with high saturation magnetization from 19 to 24 kG formed between a top surface of the write gap and a bottom surface of the first trailing shield at the ABS. A good HS response is required to reduce stray fields in the side shields and leading shield. In particular, it is desirable to have the potential of the HS more negative compared with the main pole potential.

Perpendicular magnetic recording has become the mainstream technology for disk drive applications beyond 150 Gbit/in$^2$. As the demand for hard disk drives (HDD) based on PMR head technology has increased, stray field robustness becomes more and more important in order to minimize on-track bit error rate (BER) and servo erasure when a stray field is applied. With the growing demand for cloud storage and cloud-based network computing, high and ultra high data rate recording becomes important for high-end disk drive applications. Thus, it is essential to design a PMR writer that can achieve high area density capability (ADC) in addition to improved stray field robustness characterized by low ATE and a BER of about $10^{-6}$.

SUMMARY

One objective of the present disclosure is to provide a PMR writer design wherein a magnitude of magnetic flux in a trailing return loop is substantially greater than the magnitude of magnetic flux in the leading return loop.

Another objective of the present disclosure is to provide a PMR writer design according to the first objective that also maintains sufficient magnetic flux in the leading return loop such that ATE is not adversely affected.

These objectives are achieved by fabricating a PMR writer wherein a substantial amount of impedance is created for magnetic flux in a leading return loop that includes a return path layer (RTP) and back gap connection (BGC). The PMR writer has a main pole layer with a front side at an ABS, and a lead gap and write gap along leading and trailing sides, respectively, of the main pole. In one embodiment, a leading shield (LS) has a top portion with a front side at the ABS and a top surface thereof contacts a bottom surface of the lead gap, and a bottom portion called a leading shield connector (LSC) that is magnetically connected along a bottom surface thereof to the RTP that has a front end recessed from the ABS. There is shield connector (S2C) extending in a down-track direction to the RTP. In some embodiments, the RTP also serves as the S2B shield of the read head. In other embodiments, the RTP is the bottommost magnetic layer in the write head and the S2B shield is part of the read head. The RTP is aligned perpendicular to the ABS and parallel to the main pole bottom surface, and has a back end that adjoins the BGC. The BGC is a final portion of the magnetic pathway for magnetic flux in the leading loop to return from a magnetic medium that is proximate to the ABS to the main pole where the flux originated.

There is a first insulation layer formed on the RTP and having an ABS facing side that adjoins a lower portion of the S2C back side. A second insulation layer is disposed on the first insulation layer and has an ABS facing side that adjoins an upper portion of the S2C back side, and a top surface that is essentially coplanar with a top surface of the S2C along a first plane. Within the second insulation layer is formed a bucking coil layer with a plurality of turns between the S2C back side and the BGC wherein each turn has a top surface at the first plane and a bottom surface contacting the first insulation layer. A third insulation layer has an ABS facing side that adjoins a back side of the LSC, a thickness essentially the same as the LSC, and has a bottom surface contacting the first plane and covering the second insulation layer. A fourth insulation layer is disposed on the third insulation layer, has an ABS facing side contacting a back side of the leading shield, and extends towards the back end of the PMR writer. A bottom yoke and the main pole are sequentially formed on the fourth insulation layer.

According to one embodiment, the BGC is a magnetically filled via with a bottom surface contacting a back portion of the RTP, and a top surface contacting a bottom surface of a back portion of the main pole, and is formed within the first through fourth insulation layers. Preferably, the BGC has a surface area in a plane orthogonal to the ABS that is substantially reduced compared with a conventional BGC surface area in order to generate a larger impedance between the RTP and main pole. In a second embodiment, the shape of the BGC connection is modified to reduce surface area and thereby increase impedance in the leading loop. For example, a typical rectangular or semi-circular shape from a top-down (down-track) view may be replaced by a long bar shape. According to another embodiment, the RTP may be thinned in a down-track direction, or modified to have a saturation magnetization value substantially less than 10 kG to reduce the magnetic flux in the leading loop.

In another embodiment, all or part of the BGC is removed and is replaced by one or more insulation layers such that the magnetic connection in the leading return loop is broken by a dielectric gap. For example, the dielectric material in the third and fourth insulation layers may replace the magnetic material in an upper portion of the BGC, and the dielectric material in the first insulation layer may replace the magnetic layer in a lower BGC portion. Furthermore, a dummy coil made of Cu, for example, may replace the middle BGC portion formed within the second insulation layer so that the writer protrusion/reader protrusion ratio is substantially maintained during heating from one or more heaters formed within one or more insulation layers in the combined read head/write head structure.

In all embodiments, the greater impedance to magnetic flux in the leading return loop because of modifications to the RTP or BGC results in enhanced magnetic flux within the trailing return loop. Magnetic flux enters the trailing return loop through a front side of a first trailing shield at the ABS. Preferably, the first trailing shield includes a hot seed layer with a saturation magnetization value >19 kG that contacts a top surface of the write gap. Flux flows through the hot seed layer and first trailing shield into a second (PP3) trailing shield that has a front side at the ABS and arches over the driving coils to connect to a top yoke that adjoins a top surface of the back portion of the main pole thereby completing the trailing return loop.

A key feature of the present disclosure is that enhanced magnetic flux in the trailing return loop provides better ADC because of improved hot seed layer response compared with a conventional DWS design. Meanwhile, a sufficient amount of flux is retained in the leading shield and return path layer thereby enabling ATE to be kept at an acceptable level that is a considerable improvement over a non-DWS design where there is no leading shield or return pole.

A process sequence for replacing one or more magnetic sections with dielectric material in the back gap connection is provided to form a dielectric gap between back portions of the return path layer and main pole.

DETAILED DESCRIPTION

Figure 1:
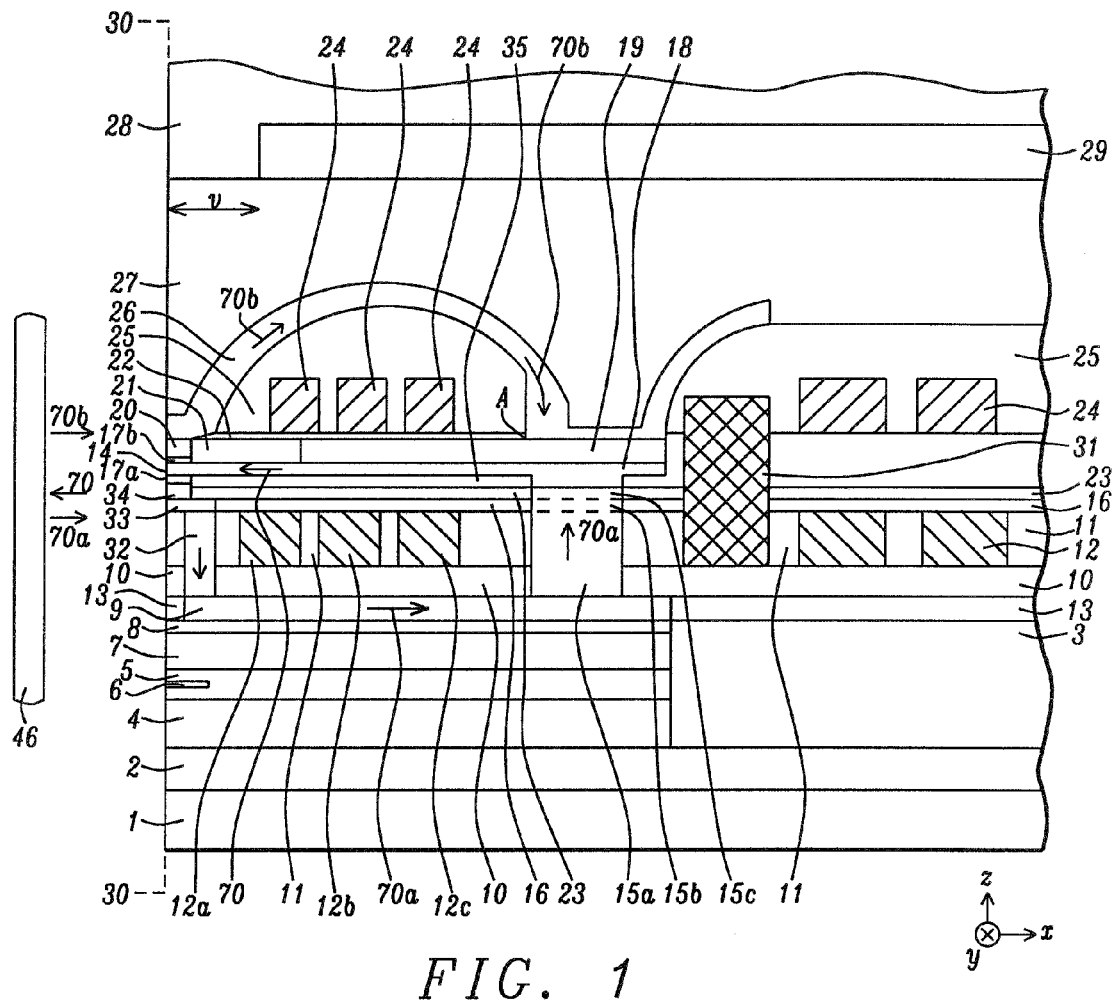
FIG. 1 is a down-track cross-sectional view showing a PMR writer with a double write shield (DWS) configuration according to a current process of record (POR) as practiced by the inventors.

The present disclosure relates to a PMR writer wherein magnetic impedance is increased in a leading return loop and particularly between a return path layer and main pole in order to enhance magnetic flux in a trailing return loop. The PMR writer may have a combined read head/write head structure. Furthermore, the driving coil turns may be stacked in a vertical arrangement rather than in a conventional horizontal scheme as described in related U.S. Pat. No. 8,218,264. In the drawings, the y-axis is a cross-track direction, the z-axis is a down-track direction, and the x-axis is in a direction orthogonal to the ABS and towards a back end of the device.

Referring to FIG. 1, a PMR writer with a combined read head/write head structure currently fabricated by the inventors is depicted in a cross-sectional view from a plane that is orthogonal to an air bearing surface (ABS) 30-30. The combined read head/write head is formed on a substrate 1 that may be comprised of AlTiC (alumina+TiC). Those skilled in the art will recognize that layers 2-8 represent the read head portion of the recording device while layers 9-35 represent the write head portion. The substrate is typically part of a slider (not shown) formed in an array of sliders on a wafer. After the read head/write head is completed, the wafer is sliced to form rows of sliders. Each row is typically lapped to afford an ABS before dicing to fabricate individual sliders that are used in magnetic recording devices.

The present disclosure anticipates that one or more dynamic fly height (DFH) heater elements (not shown) may be formed in one or more insulation layers in the PMR writer structure to control the extent of thermal expansion (protrusion) along the ABS toward a magnetic medium 46 during a read or write process. Read gap (RG) and write gap (WG) protrusion may be tuned by the placement of the one or more DFH heater elements, and by the choice of metal or alloy selected for the DFH heater elements since each DFH heater resistor material has a particular thermal and mechanical response to a given electrical input.

A first insulation layer 2 that may be comprised of alumina or another dielectric material is disposed on substrate 1. There is a second insulation layer 3 formed on the first insulation layer and behind the read head layers 4-8. Above layer 2 is the S1 shield 4 that is comprised of NiFe or CoFeNi or the like, and extends from the ABS toward a back end of the read head. A read gap 5 is formed between the S1 shield 4 and S2A shield 7. A magnetoresistive element or sensor 6 is formed in the read gap 5 along the ABS 30-30 and typically includes a plurality of layers (not shown) in which two ferromagnetic layers are separated by a non-magnetic layer. The magnetic moment direction in one of the ferromagnetic layers is fixed and provides a reference direction, and the moment direction in the other ferromagnetic layer may be rotated by the magnetic field from the media. Resistance across the read gap changes as the moment in the second ferromagnetic layer rotates. A "0" or "1" magnetic state can be defined depending on whether the two ferromagnetic layers are magnetically aligned in the same direction or in an anti-parallel fashion. The non-magnetic layer in the sensor 6 may be comprised of Cu in a giant magnetoresistive (GMR) sensor, or may be an insulator such as alumina or MgO in a tunneling magnetoresistive (TMR) sensor.

Magnetic layer 7, insulation layer 8, and RTP 9 are sequentially formed on the read gap 5. In some embodiments, the RTP serves as the S2B shield in the read head while magnetic layer 7 is the S2A shield. In other embodiments, magnetic layer 7 is a top read shield layer having a stack represented by S2A shield/insulation layer/S2B shield. S2A and S2B layers may be made of the same magnetic material as in the S1 shield 4. Insulation layer 8 may be the same dielectric material as in insulation layer 2. Although RTP 9 is recessed from the ABS, the RTP may serve as a flux return pathway in the write head portion by magnetically connecting S2C 32 with BGC 15 in pathway 70a that includes a leading shield 34, leading shield connector (LSC) 33, shield section (S2C) 32, the RTP, and a back gap connection comprised of magnetic sections 15a-15c.

Figure 2:
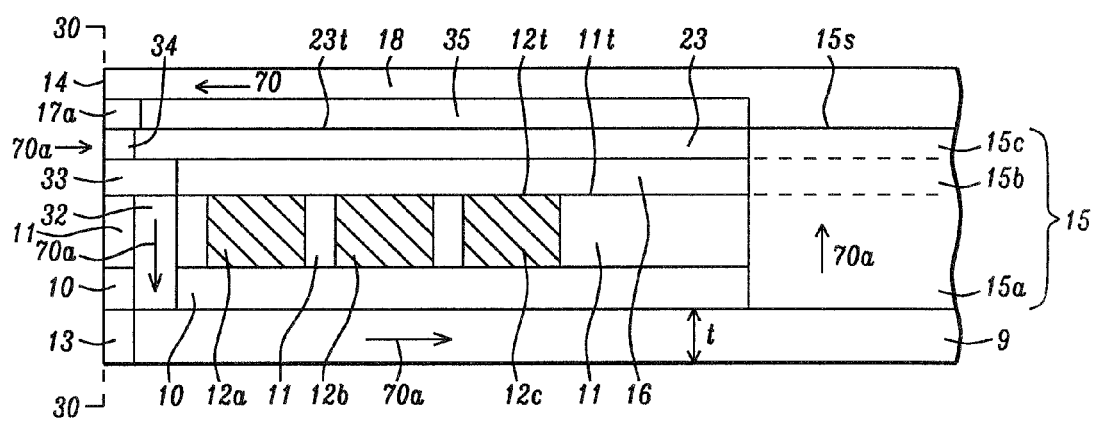
FIG. 2 is a down-track cross-sectional view showing an enlarged portion of the magnetic flux leading return loop in the PMR writer in FIG. 1.

In FIG. 2, an enlarged portion of the write head that includes the back gap connection (BGC) 15 is shown. The BGC has three sections formed in a laminated manner and represented by stack 15a/15b/15c wherein a bottommost (lower) section 15a contacts a top surface of the RTP 9, and an uppermost section 15c with top surface 15s contacts a back portion of the bottom surface of main pole 18. In the exemplary embodiment, there is a first insulation layer 10 formed on the RTP and having an ABS facing side adjoining a bottom portion of the S2C 32 back side, and a back side abutting an ABS facing side of BGC lower section 15a. A second insulation layer 11 is formed on the first insulation layer and extends orthogonal from the ABS and from an upper portion of the S2C back side to an ABS facing side of BGC section 15a. Insulation layers 10, 11 have a combined thickness essentially equal to that of BGC section 15a. In some embodiments, a bucking coil layer 12 with three turns 12a-12c in a so-called 3+3T design is formed within the second insulation layer and between the S2C back side and BGC section 15a. However, the present disclosure also anticipates that a bucking coil layer with a 1+1T, 2+2T, or 4+4T configuration may be employed as appreciated by those skilled in the art. Bucking coils are wound in series with an opposite polarity to that in the driving coils 24 to minimize direct coupling between the trailing shield 20 and driving coils. Bucking coil layer top surface 12t is preferably coplanar with a top surface 11t of the second insulation layer, a top surface of BGC section 15a, and a top surface of S2C 32.

There is an insulation layer 13 at the ABS that adjoins a front (ABS) facing side of RTP 9. First insulation layer 10 is above insulation layer 13 at the ABS and adjoins a front facing side of S2C 32. LSC 33 is separated from the ABS by a portion of insulation layer. Insulation layers 10 and 13 are comprised of a dielectric material and second insulation layer 11 may be a photoresist layer or alumina. The bucking coil layer 12 is typically a conductive material such as Cu. In the process of record (POR) practiced by the inventors, leading shield 34, LSC 33, S2C, back gap connection 15, and RTP 9 may be made of NiFe, CoFe, CoFeNi or the like with a saturation magnetization value of 10 kG to 16 kG.

A third insulation layer 16 contacts the top surface of the bucking coil turns 12a-12c and the second insulation layer 11 between a back side of LSC 33 and an ABS facing side of BGC section 15b. There is a fourth insulation layer 23 formed on the third insulation layer and on a back end portion of the LSC. The fourth insulation layer extends from a back side of the leading shield 34 to an ABS facing side of uppermost BGC section 15c. According to one embodiment, third and fourth insulation layers have a thickness in a down-track direction substantially the same as BGC sections 15b, 15c, respectively. Thus, top surface 23t of the fourth insulation layer is essentially coplanar with a top surface 15s of the BGC. A bottom yoke 35 is provided between lead gap 17a and a back portion of the main pole that adjoins top surface 15s. The bottom yoke contacts top surface 23t and has a thickness essentially equal to that of the lead gap.

Above the bottom yoke is the main pole layer 18 that may be comprised of NiFe, CoFe, CoFeNi, or CoFeN, and is preferably a 19 kG or 24 kG material. Main pole 18 has a front portion with a write pole tip 14 at the ABS 30-30 and extends toward the back end of the device with a sufficient length to connect with back gap connection 15. The leading shield is separated from the main pole by lead gap 17a. Flux 70 from the main pole enters a magnetic medium (not shown) and returns in part as flux 70a though the leading loop comprised of LS 34, LSC 33, S2C 32, RTP 9, and BGC 15.

Returning to FIG. 1, a first write shield layer 20 has a bottom surface formed on a write gap 17b at the ABS and extends a throat height distance away from the ABS 30-30 to an ABS facing (front) side of non-magnetic layer 21. The first write shield layer 20 also known as the first trailing shield may be made of CoFeN, CoFeNi, NiFe, or CoFe, for example, and may be coplanar with the non-magnetic layer 21. The first write shield may be a composite including a lower magnetic layer that is a hot seed layer as described previously that contacts a top surface of the write gap. The trailing shield functions as a flux return pole and is magnetically coupled to the main pole through a second trailing shield portion named PP3 26. The upper portion of trailing shield layer 20 and PP3 trailing shield 26 are typically made of 16 kG to 19 kG materials.

There is a top yoke 19 adjoining a back side of the non-magnetic layer 21 and contacting a top surface of the main pole 18. The top yoke and bottom yoke transmit magnetic flux to the main pole where the flux 70 is concentrated at the write pole tip 14. The top yoke extends to a back side at point A where top yoke 19 touches the inner corner of PP3 26 on a back portion of the main pole. Bottom yoke 23 is included in the write head structure to provide a faster writer response compared with designs where only a top yoke is employed. An insulation layer 22 is formed on a portion of the non-magnetic layer 21 and top yoke. A current is passed through the driving coil layer 24 that is disposed on the insulation layer 22 to generate magnetic flux in the top yoke 19 and in the main pole. The driving coil layer 24 may have a plurality of turns but only three turns are depicted above the main pole in this embodiment. Bucking coils are connected to driving coils through connector 31 that is a greater distance from the ABS than BGC 15.

First trailing shield 20 is separated from write pole tip 14 at the ABS by a write gap 17b that is made of an insulation material. Trailing shield layer 26 referred to as PP3 is formed on first trailing shield 20 at the ABS and on a portion of insulation layer 22 that is above non-magnetic layer 21. In the exemplary embodiment, the PP3 trailing shield arches over the first three driving coils in layer 24 with a dome shape and connects with the top surface of the main pole in a region overlying the BGC 15 and proximate to the top yoke back side. In other embodiments, the PP3 trailing shield may have a planar shape above the driving coils with a top surface formed parallel to a top surface of the main pole. An insulation layer 25 is formed on the insulation layer 22 and fills the openings between the turns of driving coil layer 24 and the space between a top surface of the driving coils and a bottom surface of PP3 trailing shield layer 26.

A protection layer 27 covers the PP3 trailing shield and is made of an insulating material such as alumina. Above the protection layer and recessed a certain distance from the ABS 30-30 is an optional cover layer 29 that is preferably comprised of a low CTE material such as SiC that serves to reduce the WG protrusion rate. The SiC cover layer is recessed to avoid introducing a material at the ABS with different mechanical and etch resistance properties than adjacent layers which could adversely affect back end lapping and ion beam etching processes. Overcoat layer 28 is formed as the uppermost layer in the write head.

The PMR writer in FIG. 1 has two pathways for magnetic flux to return to the write head from a magnetic medium 46. For example, magnetic flux 70 from main pole 18 exits through pole tip 14 into the magnetic medium and may return via leading loop 70a as described previously. Flux from the magnetic medium also returns to the write head via pathway 70b by entering first write shield 20 at the ABS and then passing through PP3 trailing shield 26 before reaching the main pole. The dual flux return pathway in the POR design is employed to reduce STE. Typically, about 50% of flux returns through pathway 70a and about 50% through pathway 70b in the POR design that has a double write shield (DWS) configuration.

Figure 3:
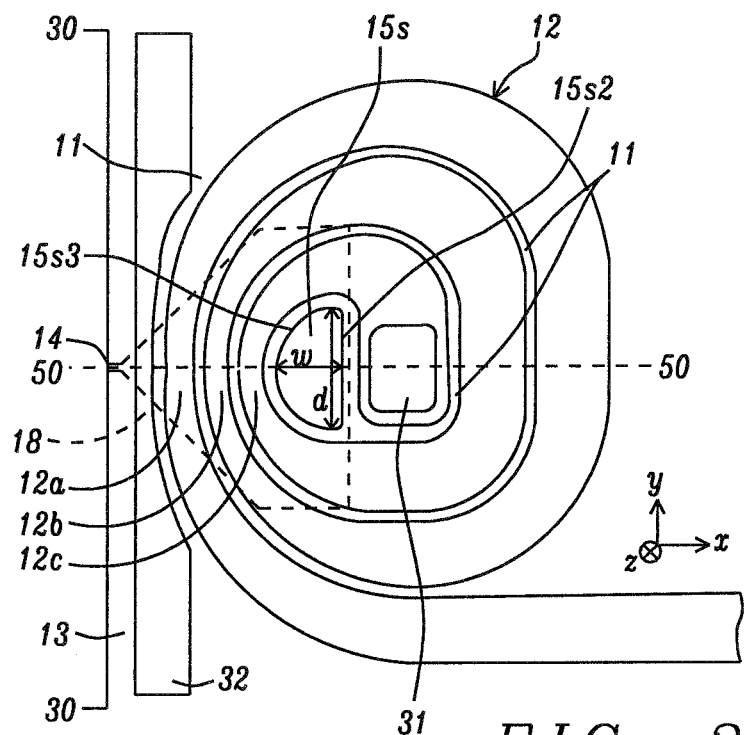
FIG. 3 is a top-down view of the leading return loop structure in FIG. 2 where the main pole and top yoke are removed to show the BGC top surface.

Referring to FIG. 3, a top-down view of the bucking coil layer 12 with turns 12a-12c, and BGC top surface 15s are shown with the top yoke, main pole, and overlying layers removed. However, an outline of main pole 18 is included in order to indicate the overlay of the main pole on the bucking coil layer. It should be understood that the top surface 15s of BGC section 15c generally has the same cross-sectional shape and area as that of BGC sections 15a-15b along any plane that is parallel to top surface 15s. Generally, the top surface has a semi-circular or substantially rectangular shape with a cross-track width d of about 4 microns and a height w of about 3 microns along a plane 50-50 that bisects the main pole through write pole tip 14 and is orthogonal to the ABS 30-30. In the exemplary embodiment, the BGC is bounded by a back side 15s2 aligned parallel to the ABS, and a curved side 15s3 that faces the ABS and is bisected by plane 50-50 at a point that is closest to the ABS. Note that FIGS. 1-2 are down-track cross-sectional views taken along plane 50-50 in FIG. 3.

A key feature of the present disclosure is a leading loop magnetic structure wherein magnetic impedance is increased in order to reduce magnetic flux through the leading return loop 70a thereby enhancing magnetic flux in trailing return loop 70b compared with a typical DWS design in FIG. 1. Various embodiments to achieve this desirable result are described herein.

Figure 4:
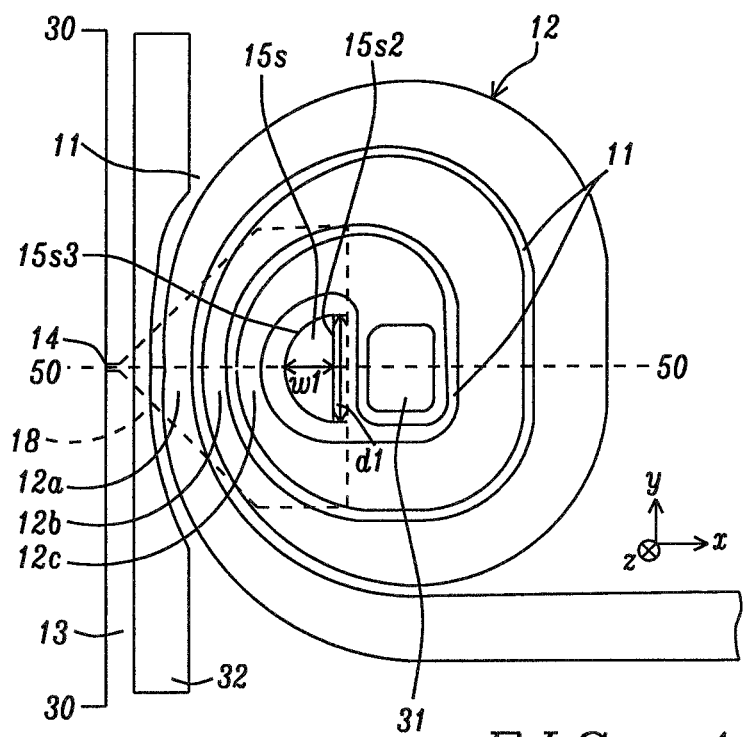
FIG. 4 is a top-down view of the BGC and bucking coil layer according to an embodiment of the present disclosure where magnetic flux in the leading loop is reduced by increasing impedance as a result of a smaller BGC surface area.

According to FIG. 4, a first embodiment of the write head in the PMR writer of the present disclosure is depicted from a top-down view of the bucking coil layer 12 and BGC top surface 15s. In particular, all of the magnetic shield structure in FIG. 1 is retained. However, the cross-sectional area of the BGC 15 in any section 15a-15c along a plane that coincides with or is parallel to top surface 15s is reduced such that cross-sectional width d1 is substantially less than d, and/or height w1 in the x-axis direction is substantially less than w. For example, the area of top surface 15s may be reduced 50% or more in an embodiment where d1 is ≤2 microns and w1=w. In another embodiment, the general shape of the BGC is retained from the POR design such that back side 15s2 is parallel to the ABS 30-30 and a curved side 15s3 faces the ABS and is bisected by plane 50-50, and where w1 and d1 are about 0.5×w and 0.5×d, respectively.

Figure 5A:
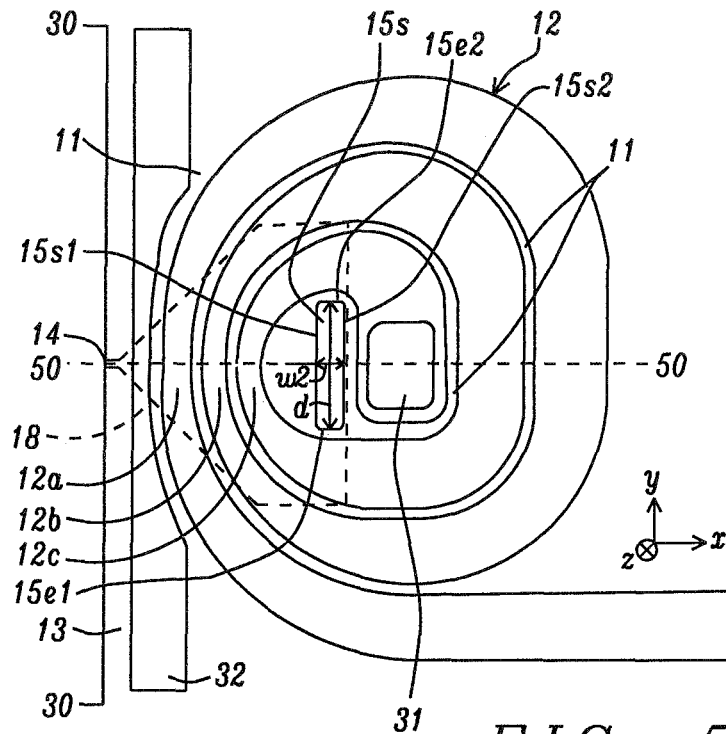
FIGS. 5a-5b are top-down views of the BGC and bucking coil layer according to a second embodiment of the present disclosure where magnetic flux in the leading loop is reduced by increasing impedance as a result of a long bar BGC shape.
Figure 5B:
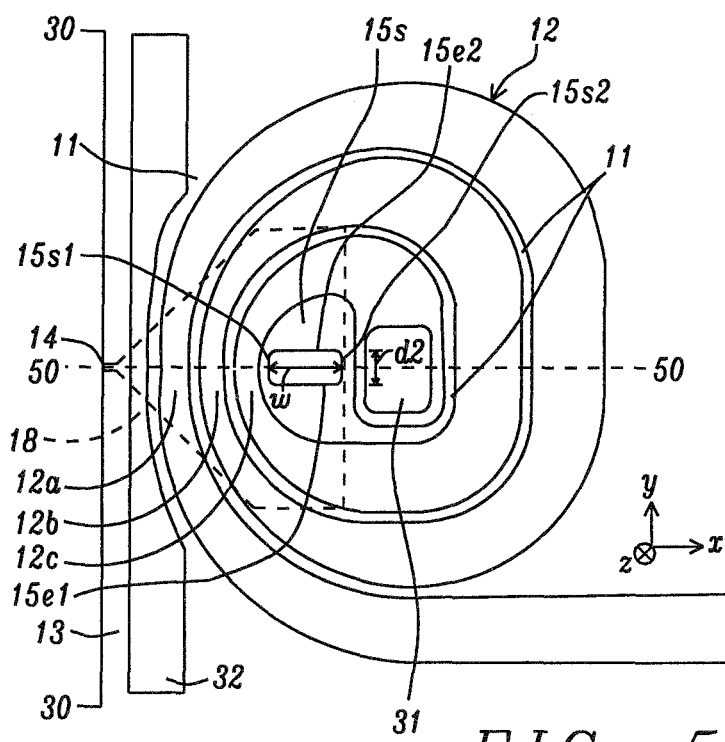

Referring to FIG. 5a, a second embodiment of the present disclosure is depicted wherein the shape of the BGC from a top-down view is modified to a long bar. A long bar shape with a cross-sectional area substantially less than d×w in FIG. 3 is an alternative design to increase impedance between RTP 9 and the main pole 18 compared with a conventional BGC shape. In one aspect, the cross-sectional width d may be retained but the height w2 is substantially reduced to about 1 micron. In FIG. 5b, another long bar shape is depicted where the long bar has a height dimension orthogonal to the ABS and greater than the cross-track dimension. In the exemplary embodiment, height w is maintained at about 3 microns, but the cross-track dimension d2 is substantially less than d, and may be about 1-2 microns. There is an ABS facing side 15s1 that is parallel to back side 15s2. Front and back sides are connected by ends 15e1, 15e2 to form a substantially rectangular shape. However, there may be some rounding on the ends of the long bar due to the photolithography and etch sequence that is employed to generate an opening wherein magnetic material is deposited to form the BGC 15. Preferably, the front side 15s1 and back side 15s2 are bisected by plane 50-50 and are separated by distance w2 in FIG. 5a or w in FIG. 5b.

Figure 6:
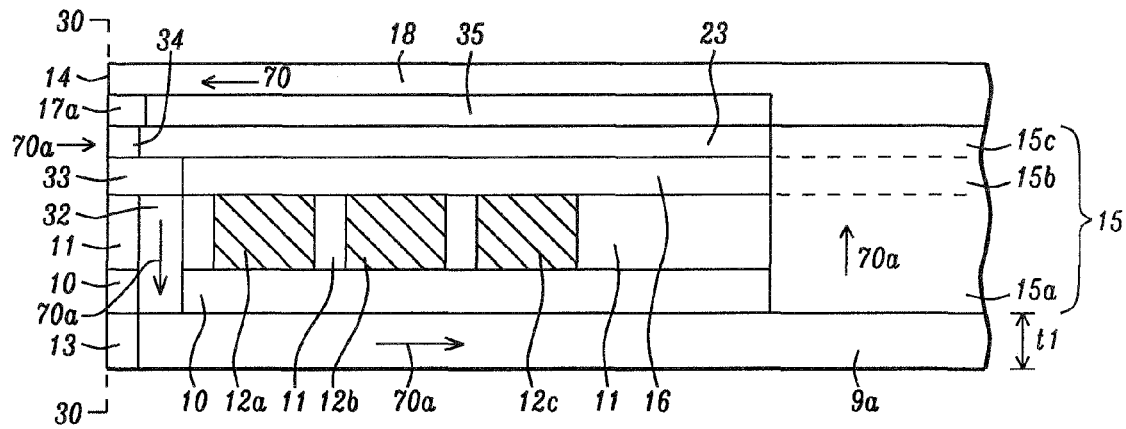
FIG. 6 is a down-track cross-sectional view of a third embodiment of the present disclosure wherein leading loop impedance is increased by reducing RTP thickness.

In a third embodiment depicted in FIG. 6, the RTP and/or S2C 32 are modified to increase impedance in the leading loop. For example, the RTP 9a may be substantially thinned to a thickness t1 of 0.4-0.6 micron or less. The POR RTP 9 in FIG. 1 has a thickness t in the range of 0.6 to 1.1 microns, and preferably about 0.9 microns. In an alternative embodiment, the RTP and/or the S2C may be fabricated to have a saturation magnetization value less than 10 kG by increasing the Ni content in a NiFe or CoFeNi alloy, or by incorporating a non-magnetic element such as Hf, Zr, Nb, Mo, Ti, Cr, or the like in the magnetic alloy employed for the RTP composition. The present disclosure also anticipates a leading loop magnetic structure wherein RTP 9a is substantially thinned to a thickness t1, and one or both of the RTP and S2C are modified to have a saturation magnetization value <10 kG. Furthermore, the third embodiment may include any of the top-down BGC 15s shapes depicted in FIGS. 3-5 in combination with one or both of a thin RTP 9a and a RTP/S2C structure that is made of a <10 kG material.

A key feature of the first through third embodiments is that magnetic flux 70b is enhanced in the trailing loop while magnetic flux 70a is decreased in the leading loop compared with the POR (DWS) design in FIG. 1. As a result, the hot seed layer in trailing shield 20 becomes more negative to main pole potential and this condition translates to a better return field at the main pole trailing edge adjoining write gap 17b during writing. The better return field is responsible for improving the field gradient, and improved bit error rate (BER) and ADC are also achieved. Meanwhile, sufficient flux is retained in the leading loop so that stray field in the side shields (not shown) and leading shield is suppressed thereby maintaining an acceptable ATE similar to that of the DWS writer structure in FIG. 1.

Figure 7:
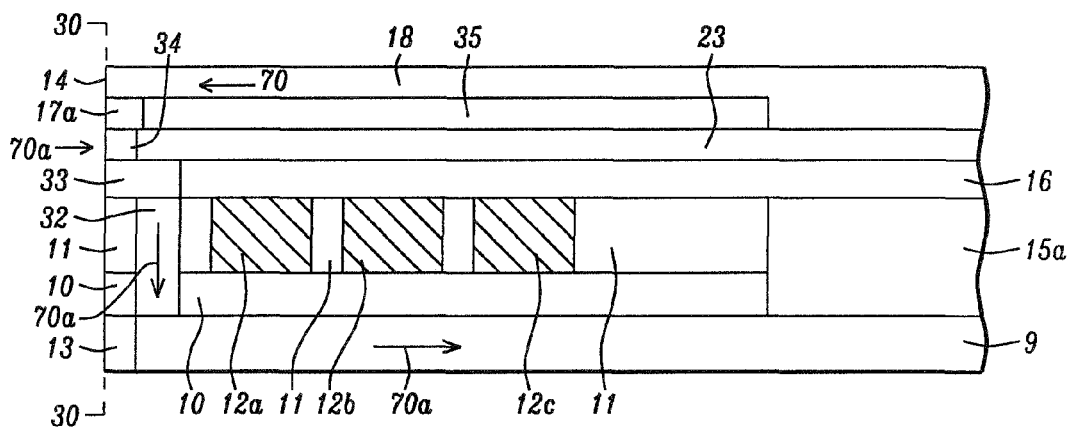
FIG. 7 is an enlargement of the leading flux return loop of a PMR writer according to an embodiment of the present disclosure wherein one or more magnetic sections in the BGC are omitted and replaced by dielectric material.

According to a fourth embodiment shown in FIG. 7, magnetic impedance in the leading loop, and particularly between the RTP 9 and main pole 18, is enhanced by removing one or more BGC sections 15a-15c and replacing with dielectric material. For example, section 15b may be replaced by the same dielectric material as in third insulation layer 16, and uppermost section 15c may be replaced by the same dielectric material that is in fourth insulation layer 23. As a result, insulation layers 16, 23 now form a dielectric gap between a top surface of BGC section 15a and a back portion of the main pole. All other features of the PMR writer POR design in FIG. 1 are retained. A method for replacing one or all of the BGC sections is described in a later section.

Figure 8:
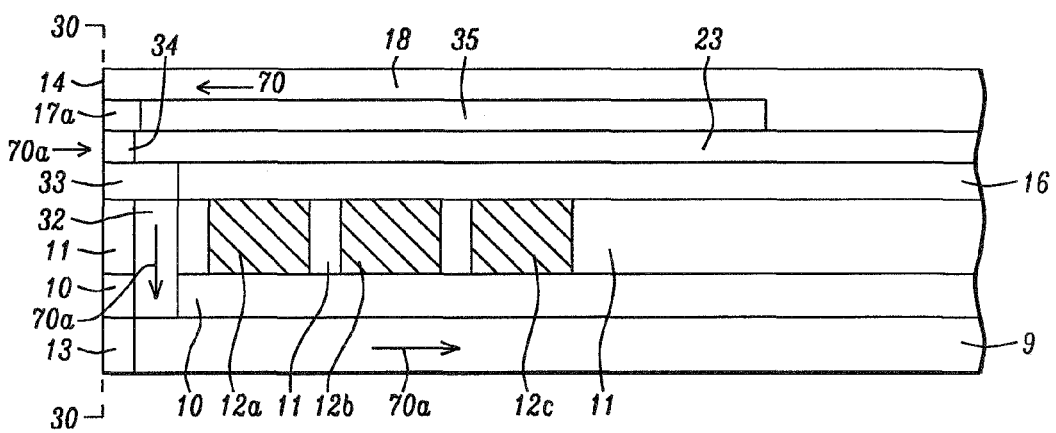
FIG. 8 is an enlargement of the leading return loop of a PMR writer wherein the BGC is entirely replaced by dielectric material between the RTP and main pole.

Referring to FIG. 8, the present disclosure also encompasses a non-BGC embodiment wherein all magnetic sections 15a-15c are replaced by dielectric material. Thus, the structure in FIG. 7 may be further modified to replace a lower portion of BGC section 15a with the same dielectric material as in first insulation layer 10 and to replace an upper portion with the same material as in second insulation layer 11. As a result, there is a dielectric gap between a top surface of RTP 9 and main pole 18 such that magnetic flux 70a has no magnetic pathway to return to the main pole. A small portion believed to be up to 5%-10% of magnetic flux 70a leaks through insulation layers 10, 11, 16, and 23 to return to the main pole.

Figure 9:
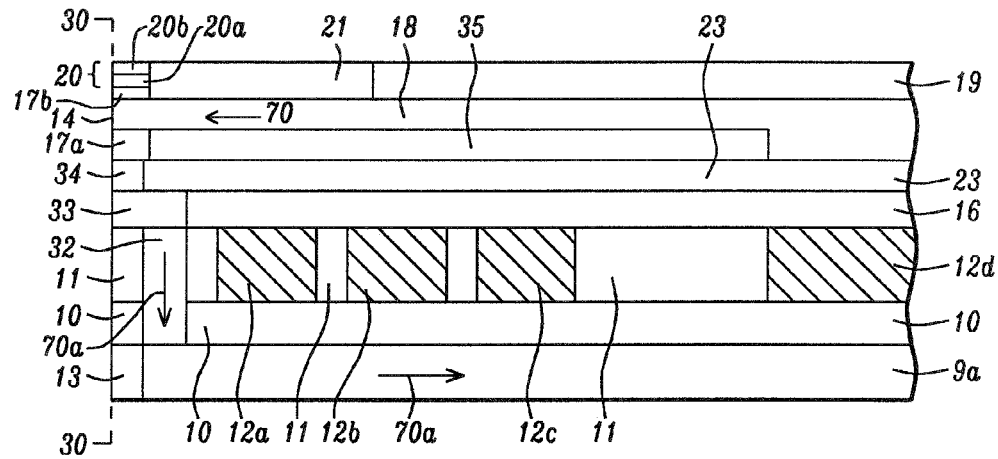
FIG. 9 is an enlargement of the leading return loop of the PMR writer according to another embodiment of the present disclosure wherein the BGC is omitted and replaced by dielectric material and a non-magnetic metal.

Referring to FIG. 9, another non-BGC embodiment of the present disclosure is depicted wherein the writer structure in FIG. 8 is modified to include a dummy coil 12d in second insulation layer 11 as a replacement for the upper portion of BGC 15a. By employing a non-magnetic metal such as Cu instead of a dielectric material to replace the upper portion of magnetic BGC section 15a, the extent of write gap protrusion per unit of thermal energy applied by a heater (not shown) is substantially maintained because it is well known that metals have a higher thermal coefficient of expansion (TCE) than dielectric materials.

Figure 10:
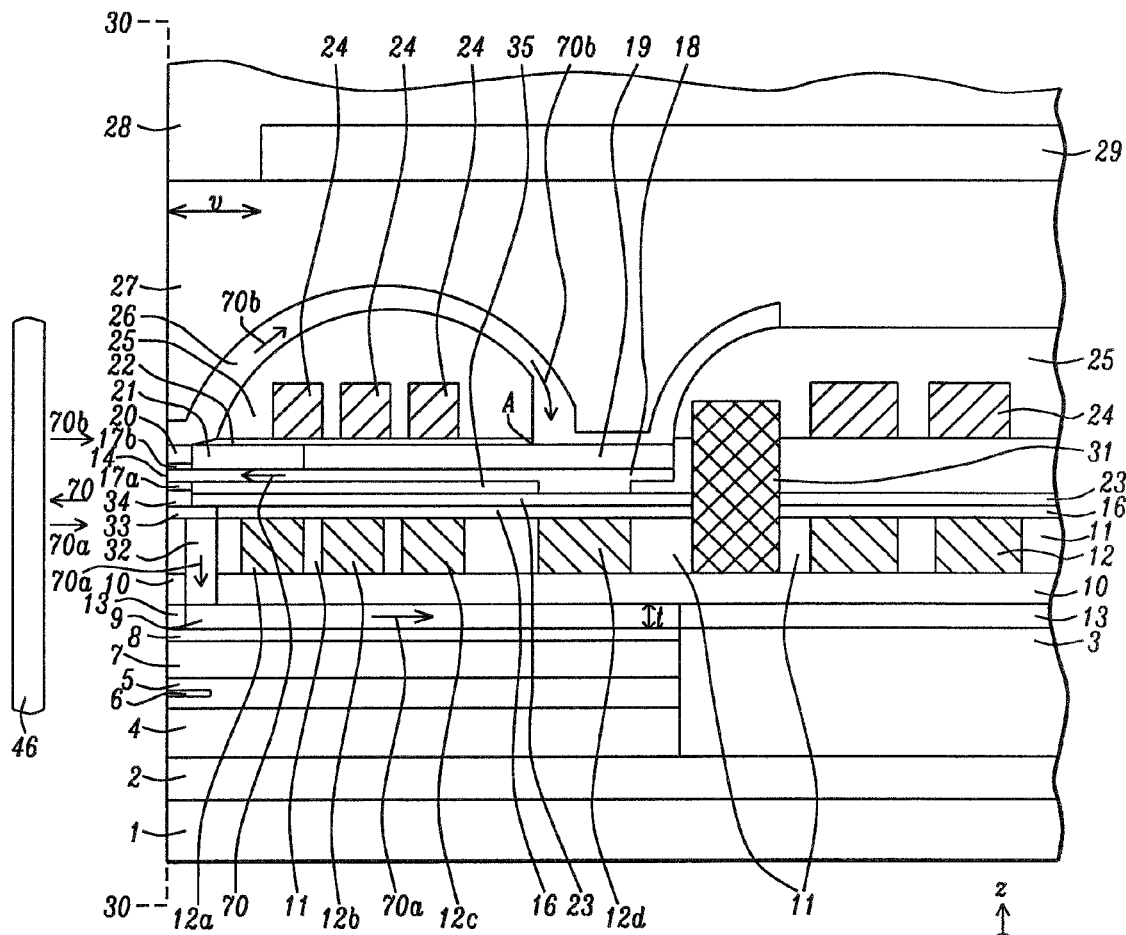
FIG. 10 is a down-track cross-sectional view of the PMR writer in FIG. 9.

In all of the FIG. 7, FIG. 8, and FIG. 9 embodiments, the leading flux return loop is broken by a dielectric gap so that magnetic flux 70a is leaked into free space and only a small fraction of magnetic flux in RTP 9 returns to main pole 18. As indicated in FIG. 10 where the full PMR writer view of the FIG. 9 embodiment is depicted, magnetic flux 70b in the trailing loop pathway is enhanced compared with the POR DWS design. Moreover, there is sufficient flux 70a retained in the leading shield 34 and LSC 33 to suppress stray fields in the side shields and leading shield thereby maintaining ATE at a level similar to that for a DWS scheme in FIG. 1. It is believed that when a majority of the returning magnetic flux passes through the trailing loop as in the FIG. 7-9 embodiments, the hot seed layer 20a (FIG. 9) in trailing shield 20 becomes more negative to main pole potential. This condition translates to a better return field at the main pole trailing edge adjoining write gap 17b during writing. Furthermore, the better return field is responsible for improving the field gradient, and improved bit error rate (BER) and ADC are also achieved. The upper portion 20b of write shield 20 is made of a 16 kG or 19 kG material and adjoins a bottom surface of the PP3 shield (not shown).

Figure 11:
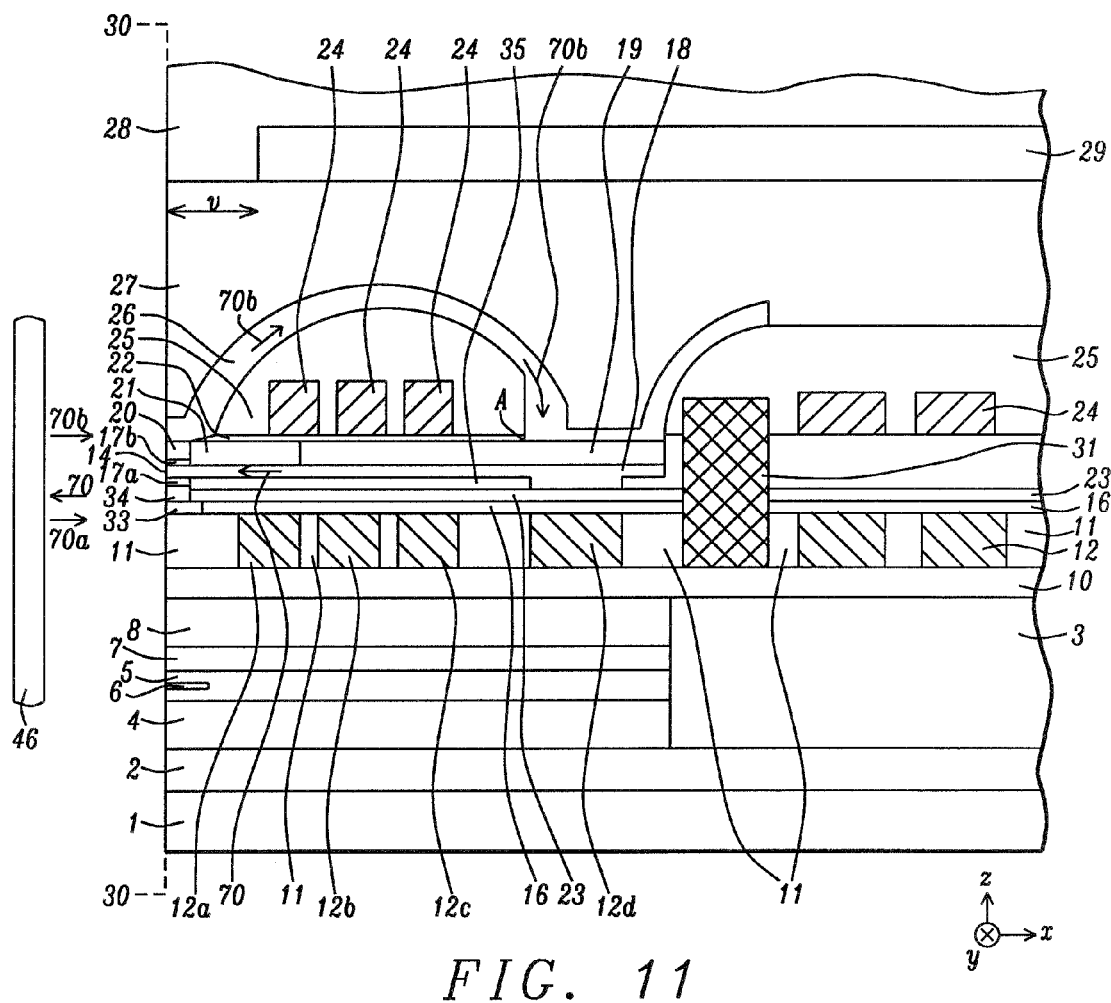
FIG. 11 is a cross-sectional view of a PMR writer with a non-DWS structure.

To demonstrate the effectiveness of the non-BGC design in FIG. 9, finite element modeling (FEM) is used to determine magnetic flux in the PP3 trailing shield, and in the return path layer (RTP) at a position 2 microns from the ABS, and the results are shown in Table 1. FIG. 11 illustrates a non-DWS scheme that is essentially equivalent to the non-BGC design except for the absence of the RTP 9 and S2C 32. In this scheme, first insulation layer extends from the ABS 30-30 to beyond connector 31, and contacts a top surface of insulation layer 8. The leading loop flux return pathway comprises only leading shield 34 and LSC 33.

TABLE 1

Magnetic flux inside PP3 trailing shield and return path at a position 2 um from ABS

| Flux plane | DWS design | non-BGC design | non-DWS design |
|---|---|---|---|
| φ_1 @PP3 | 1.26 | 1.96 | 1.85 |
| φ_2 @RTP | 0.87 | 0.16 | 0.01 |

Figure 12:
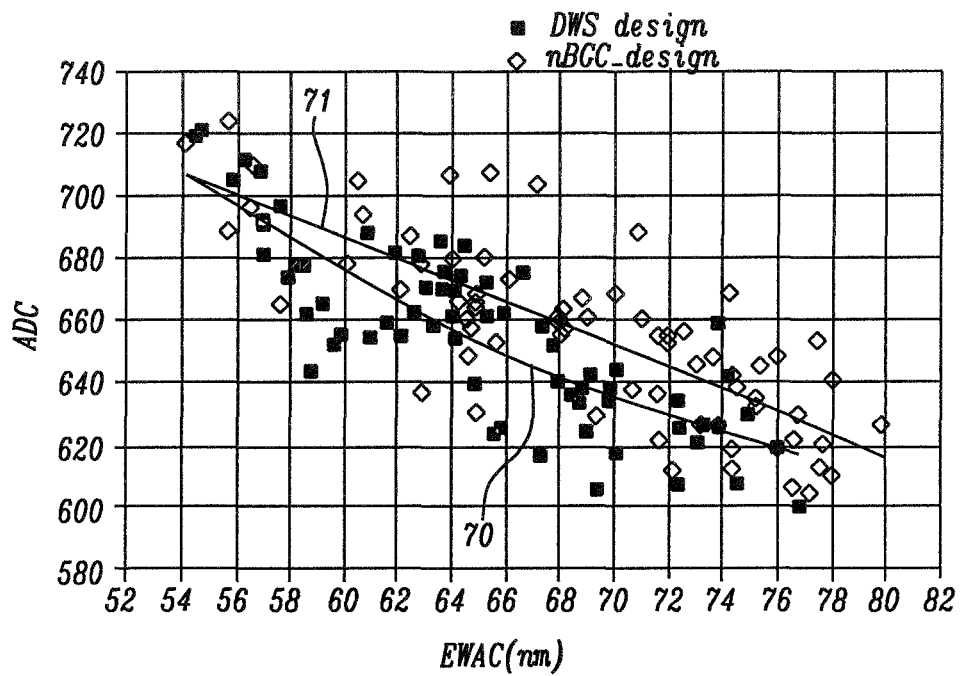
FIG. 12 is a plot of ADC vs. EWAC that demonstrates improved ADC after removing a BGC according to an embodiment of the present disclosure.

Results show that the non-BGC structure of the present disclosure has flux φ1 in the PP3 shield (trailing loop pathway) that is enhanced over both of the DWS (FIG. 1) and non-DWS (FIG. 11) schemes. As mentioned previously, greater flux in the trailing loop leads to improved ADC as depicted in FIG. 12. Meanwhile, flux φ2 at a RTP position two microns recessed from the ABS is 0.16 for the non-BGC design which is considerably reduced from a value of 0.87 for a DWS structure but substantially greater than a value of 0.01 for the non-DWS structure. In other words, a sufficient magnitude of flux is maintained through leading shield 34 and LSC 33 in the non-BGC design so that stray field is suppressed in the leading shield and side shields thereby maintaining an acceptable level of ATE.

Referring to FIG. 12, ADC improvement for the non-BGC design is illustrated with a plot of erase width in AC mode (EWAC) vs. area density capability for the DWS design (curve 70) and the non-BGC design (curve 71) in Table 1. Spinstand measurements are employed to test actual writer structures. There is an average difference of about 20 ADC units that equates to an ADC improvement of about 2% to 3% for the PMR writer having a non-BGC structure according to the present disclosure.

Figure 13:
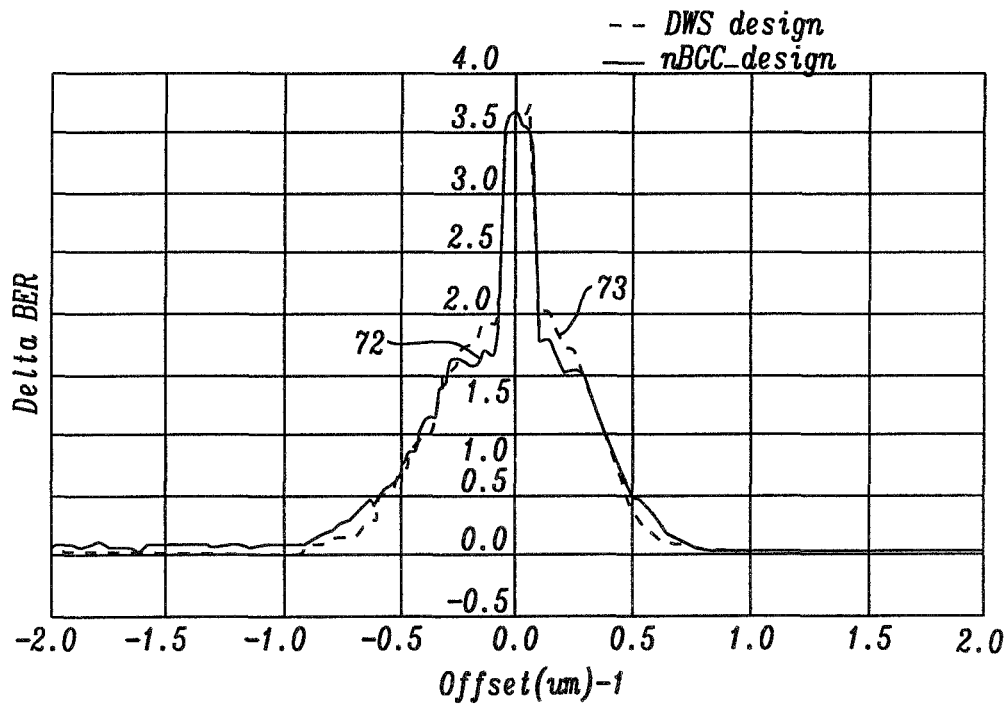
FIG. 13 is a plot of delta BER vs. track offset to illustrate there is essentially no change in ATE when comparing a DWS POR design with a PMR writer where the BGC has been removed.

In FIG. 13, delta BER is plotted as a function of offset from a center track position. Results show there is no overall difference in ATE for the non-BGC design (curve 72) compared with the DWS design (curve 73).

Figure 14:
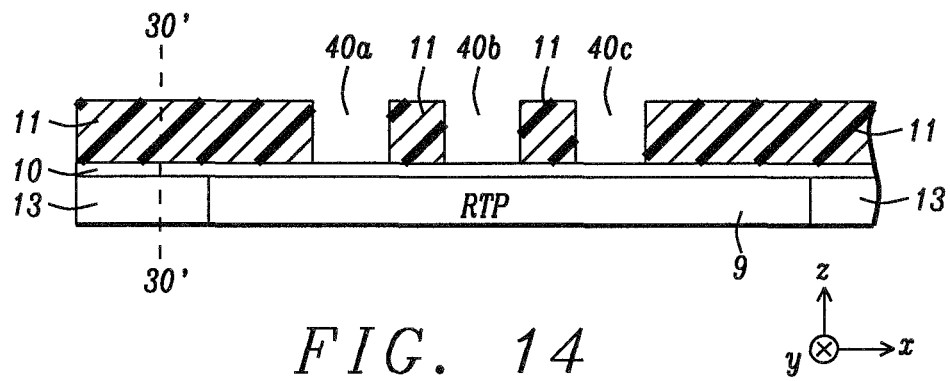
FIGS. 14-18 illustrate a sequence of steps of forming a leading shield structure, BGC, and adjacent insulation layers in the embodiments depicted in FIGS. 4-6.

The present disclosure also encompasses a method of forming a PMR writer that is disclosed in the first three embodiments (FIGS. 4-6). A process flow in FIGS. 14-18 is provided and starts at the point where RTP 9 is formed in an insulation layer 13 since all previous steps of forming a read head are well known in the art. Referring to FIG. 14, plane 30'-30' represents the eventual location of the ABS after a lapping process is performed at the end of the PMR writer fabrication sequence. The RTP may be plated in an opening (not shown) formed in insulation layer 13 and then a chemical mechanical polish (CMP) step may be employed to yield a planar top surface of the RTP that is coplanar with a top surface of insulation layer 13. Typically, RTP thickness is about 0.9 microns but may be reduced to a thickness of 0.4 to 0.6 microns according to the third embodiment depicted in FIG. 6.

Next, the first insulation layer 10 that may be alumina with a thickness of about 2000 Angstroms is sputter deposited on a top surface of insulation layer 13 and on RTP 9 (or 9a). Thereafter, the second insulation layer 11 is formed on the first insulation layer. In one aspect, the second insulation layer is a photoresist and is patternwise exposed and developed by an aqueous base, for example, to give openings 40a-40c corresponding to the desired location for the bucking coil layer to be deposited in a later step.

Figure 15:
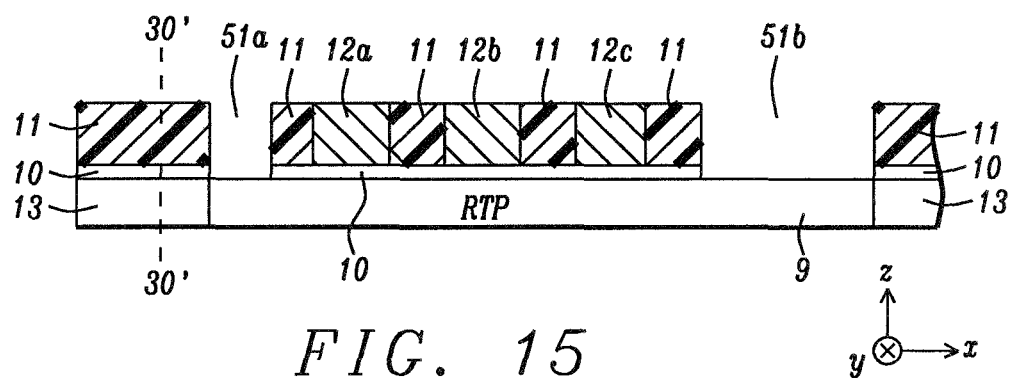

In FIG. 15, the bucking coil layer is deposited and turns 12a-12c are illustrated. Then, a second patterned exposure and development of exposed regions in the second insulation layer yields an opening 51a (corresponding to the eventual location of S2C 32) that is recessed a first distance from plane 30'-30', and a second larger opening 51b that is formed in the eventual location where the BGC is to be plated that is a greater distance than third turn 12c from the plane 30'-30'.

Figure 16:
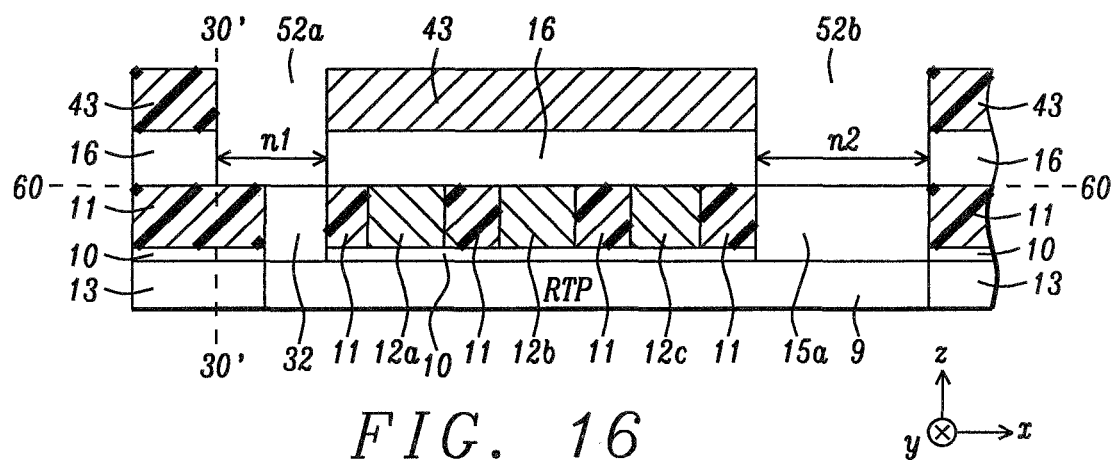

Referring to FIG. 16, S2C 32 and BGC section 15a are plated to fill openings 51a, 51b, respectively. A second CMP process is performed to generate a top surface of second insulation layer 11, SGC 32, bucking coil turns 12a-12c, and BGC section 15a along plane 60-60. The thickness of the second insulation layer and bucking coil layer after CMP may be about 1.2 microns. Next, the third insulation layer 16 and a photoresist layer 43 are sequentially formed on the aforementioned layers. Photoresist layer 43 is patterned to generate an opening 52a at the ABS that extends a distance n1 along the x-axis and overlays S2C 32, and a second opening 52b with an x-axis dimension n2 that overlays on BGC section 15a. Opening 52b has a cross-sectional area from a top-down perspective that is the desired shape and size of the BGC. Preferably, the cross-sectional area is ≤6 micron$^2$ according to the first embodiment, and in some cases may be as small as 3 micron$^2$ as mentioned previously regarding the second embodiment. The openings 52a, 52b are transferred through the third insulation layer by an etch process and stop at plane 60-60.

Figure 17:
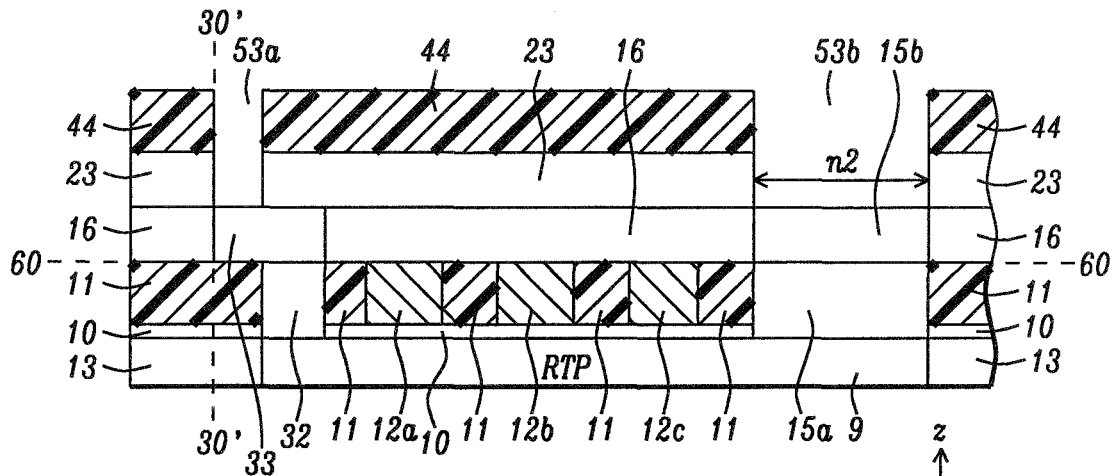

Referring to FIG. 17, LSC 33 and BGC section 15b are plated in openings 52a, 52b, respectively. A CMP process may be performed to remove photoresist layer 43 and yield a planar top surface for the LSC and BGC magnetic layers after plating. Thereafter, fourth insulation layer 23 and photoresist layer 44 are consecutively formed on a top surface of the third insulation layer. Photoresist layer 44 is patterned to form opening 53a at plane 30'-30', and opening 53b with x-axis dimension n2 above BGC section 15b.

Figure 18:
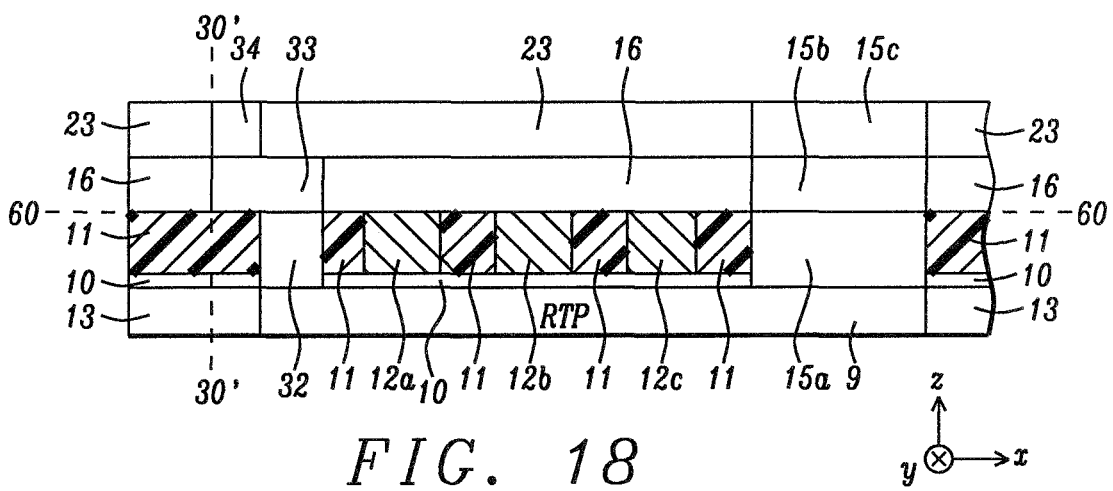

In FIG. 18, leading shield 34 and BGC section 15c are plated in openings 53a, 53b, respectively. Another CMP process may be employed to form a planar top surface on LS 34, fourth insulation layer 23, and BGC section 15c, and to remove photoresist layer 44. Hereafter, conventional process steps, well known to those skilled in the art, are followed to complete the write head. We have previously disclosed in U.S. Pat. No. 8,274,758 a method for fabricating a PP3 trailing shield in a write head, and depicted embodiments where the PP3 trailing shield may have an arch (dome) shape or a planar top surface from a down-track cross-sectional view.

Figure 19:
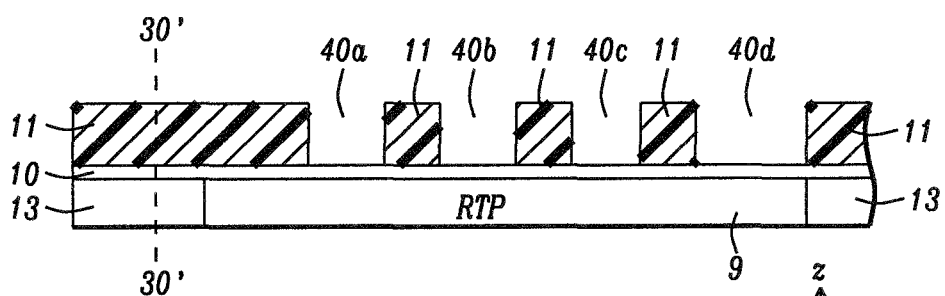
FIGS. 19-23 depict a sequence of steps for forming first through fourth insulation layers, a leading shield structure, and RTP without a BGC according to an embodiment shown in FIG. 9.

The present disclosure also encompasses a process sequence for fabricating a non-BGC embodiment as described previously with regards to FIGS. 7-11. Similar to FIGS. 14-18, only the process steps between RTP formation and main pole deposition are described herein. Referring to FIG. 19, the process flow begins with RTP 9 formed in insulation layer 13 and a first insulation layer 10 sputter deposited on the RTP. Second insulation layer 11 is then formed and patterned to form openings 40a-40c as described with respect to FIG. 14. However, the pattern is modified to include an extra opening 40d corresponding to the location of the upper portion of BGC section 15a in FIG. 15. In other words, opening 40d does not extend to RTP 9 but stops on the first insulation layer.

Figure 20:
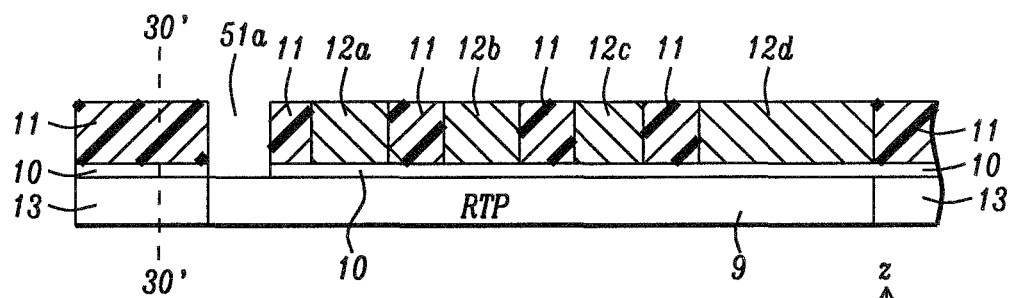

Referring to FIG. 20, a metal such as Cu is deposited in openings 40a-40d. Note that bucking coil turns 12a-12c are formed in openings 40a-40c, respectively. However, opening 40d is filled with layer 12d that represents a "dummy" coil since layer 12d is not electrically connected to turns 12a-12c. Next, a second photoresist pattern is formed as described previously with respect to FIG. 15. However, the process is modified so that only opening 51a is formed in the second insulation layer 11 between plane 30'-30' and first bucking coil turn 12a. Opening 51a extends through first insulation layer 10 and stops on RTP 9.

Figure 21:
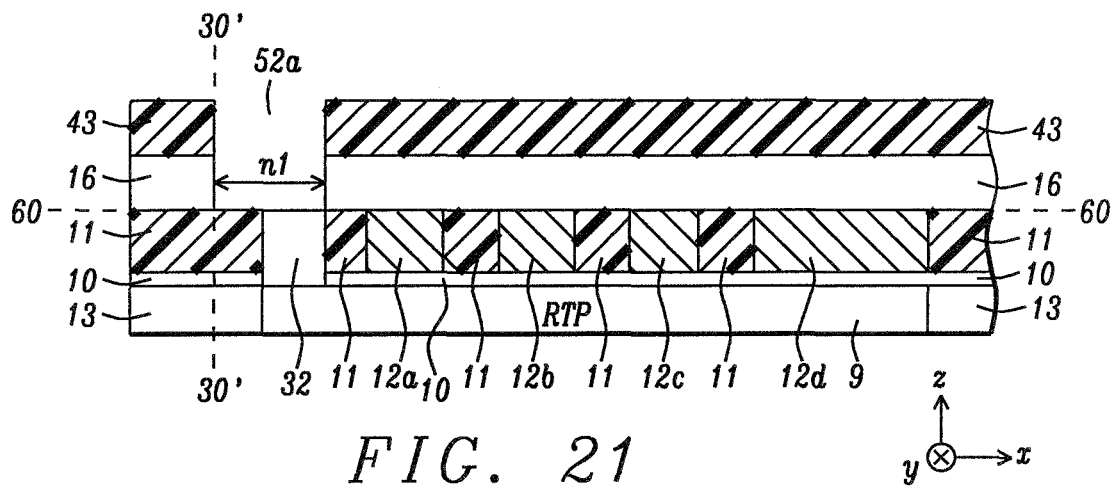

In FIG. 21, S2C 32 is plated in opening 51a and a CMP process is performed to yield a top surface for S2C, second insulation layer 11, and bucking coil layer including turns 12a-12c and dummy coil 12d along plane 60-60. Thereafter, third insulation layer 16 and photoresist layer 43 are sequentially formed on the second insulation layer, S2C, and bucking coil layer. Photoresist layer 43 is patternwise exposed and developed to give opening 52a at plane 30'-30' and extends in an x-axis direction over S2C 32.

Figure 22:
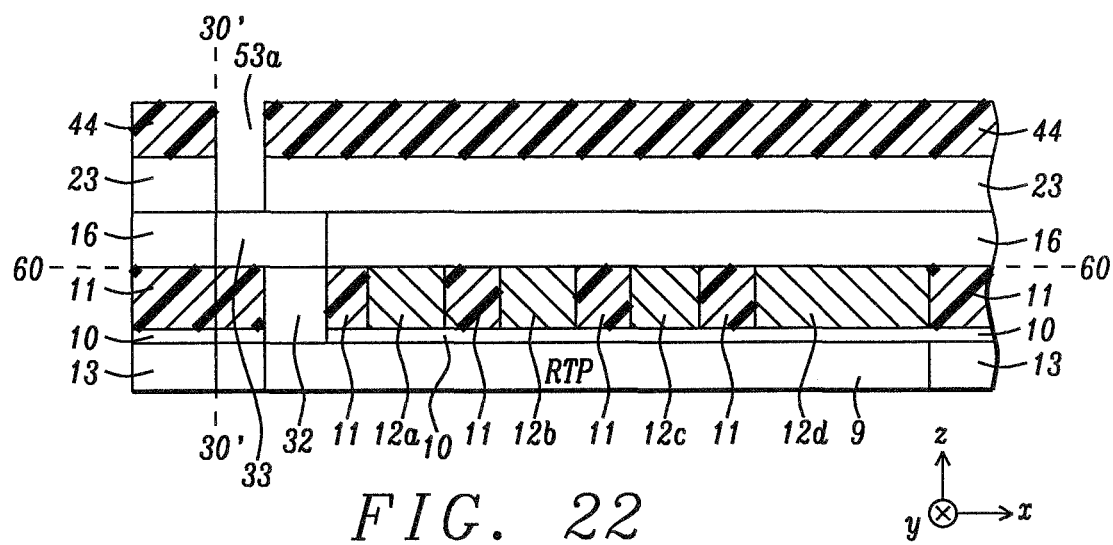

Referring to FIG. 22, LSC 33 is plated in opening 52a and a CMP process may be employed to remove photoresist layer 43 and form a planar top surface of the LSC layer that is coplanar with a top surface of third insulation layer 16. Fourth insulation layer 23 and photoresist layer 44 are sequentially formed on the third insulation layer. Opening 53a is formed in photoresist layer at plane 30'-30' above LSC 33 as described earlier, and is transferred through the fourth insulation layer by an etch process.

Figure 23:
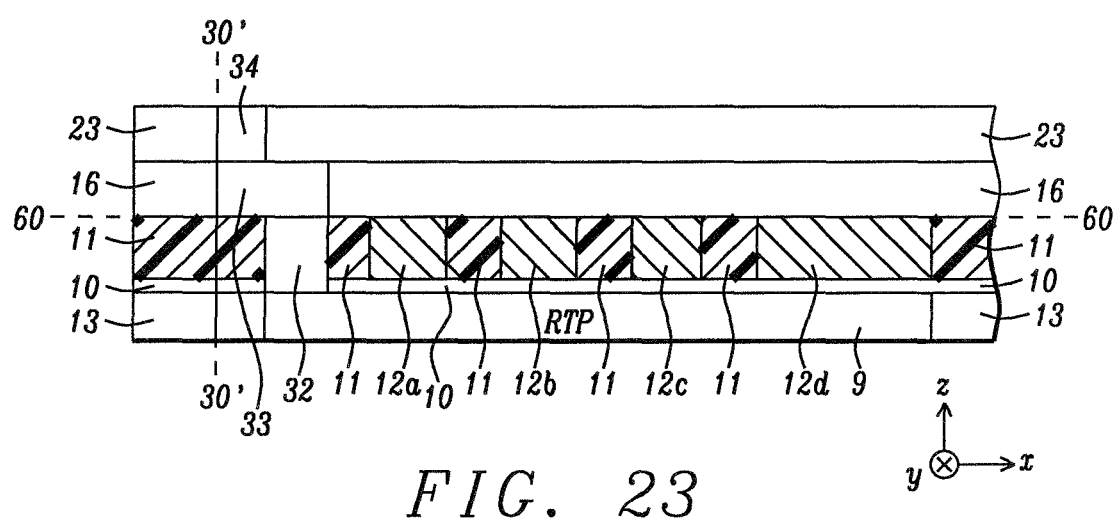

With respect to FIG. 23, leading shield 34 is plated in opening 53a and another CMP process may be employed to form a coplanar top surface comprising top surfaces of the leading shield and fourth insulation layer.

While the present disclosure has been particularly shown and described with reference to, the preferred embodiment thereof, it will be understood by those skilled in the art that various changes in form and details may be made without departing from the spirit and scope of this disclosure.

We claim:

1. A PMR writer, comprising:
   (a) a first trailing shield layer formed on a write gap and adjoining an air bearing surface (ABS), the write gap contacts a top surface of a front portion of a main pole layer at the ABS;
   (b) a second (PP3) trailing shield that adjoins a top surface of the first trailing shield layer and extends toward a back end of the PMR writer where the PP3 trailing shield contacts a top yoke formed on a top surface of a back portion of the main pole layer;
   (c) a leading shield with a top surface contacting a bottom surface of a leading gap at the ABS, the leading gap has a top surface adjoining a bottom surface of the front portion of the main pole layer at the ABS;
   (d) a leading shield connector (LSC) that contacts a bottom surface of the leading shield and extends from the ABS toward a back end of the PMR writer;
   (e) a shield section that is recessed from the ABS and adjoins a bottom surface of the LSC and a top surface of a return path layer (RTP);
   (f) the RTP with an ABS facing side that is recessed from the ABS and with a top surface that is parallel to the main pole layer bottom surface; and
   (g) a back gap connection (BGC) that is a via filled with a magnetic material and connects the top surface of the RTP to a bottom surface of the back portion of the main pole layer wherein a magnitude of magnetic flux in a return pathway from a magnetic medium through the leading shield, LSC, shield section, RTP, and BGC to the main pole layer forming a leading loop, is substantially less than a magnitude of magnetic flux returning from the magnetic medium to the main pole layer through the first trailing shield and PP3 trailing shield because of enhanced magnetic impedance in the leading loop resulting from one or both of the BGC having a cross-sectional area of about 6 micron$^2$ or less from a top-down view, and a magnetization saturation (Ms) value less than 10 kG in the RTP.

2. The PMR writer of claim 1 wherein the back gap connection has a substantially long bar shape from a down-track view wherein two sides are formed parallel to the ABS or are aligned orthogonal to the ABS and are separated by a distance of about 1-2 microns.

3. The PMR writer of claim 1 wherein the RTP has a thickness from about 0.4 to 0.6 microns.

4. The PMR writer of claim 1 wherein the shield section has a saturation magnetization value less than 10 kG.

5. The PMR writer of claim 1 wherein the magnetization saturation value is achieved by incorporating a non-magnetic element that is Hf, Zr, Nb, Mo, Ti, Cr in a magnetic alloy employed for the RTP.

6. The PMR writer of claim 1 wherein the Ms value less than 10 kG is realized by increasing a Ni content in the RTP that is comprised of a NiFe or CoFeNi alloy.

* * * * *